MAGNETIC AMPLIFIER WITH CONDENSER DISCHARGE CONTROL CIRCUIT

Filed Jan. 6, 1953

INVENTOR.
ROBERT LEROY PETERSON
BY Lyon & Lyon
ATTORNEYS 2,850,696
Patented Sept. 2, 1958

2,850,696

MAGNETIC AMPLIFIER WITH CONDENSER DISCHARGE CONTROL CIRCUIT

Robert L. Peterson, North Hollywood, Calif., assignor to General Controls Co., Glendale, Calif., a corporation of California Application January 6, 1953, Serial No. 329,894

6 Claims. (Cl. 323—63)

The present invention relates to a magnetic amplifier which is basically an impedance sensitive device and is characterized by the fact that it is sensitive to extremely low energy level signals as obtained from photoemissive or photoconductive cells, flame conduction devices, thermocouples and the like.

In general, the present invention relates to a magnetic amplifier of this character in which the current to a load, such as a solenoid, relay and the like, is controlled in accordance with the amplitude of half-wave pulses required to maintain a condenser in a substantially charged condition, such condenser having a discharge circuit which includes a control element such as a photo-electric cell capable of changing its resistance in accordance with certain stimuli; the charging circuit for such condenser includes one winding of a saturable reactor which has a second winding thereof connected in shunt with the load and in series with a source of half-wave pulses, the half-wave pulses applied to the first-mentioned winding of the saturable reactor occurring at times when the half-wave pulses applied to the other winding of the saturable reactor are not present, so that, in effect, there is what is termed herein as a control cycle and a load cycle, with the circuit conditions existing during the control cycle influencing and controlling the amount of load current supplied during the load cycle.

It is, therefore, an object of the present invention to provide improved means and techniques for accomplishing the above-indicated functions and results.

A specific object of the present invention is to provide an improved control system of this character which is sensitive to extremely low energy level signals, which is inherently stable, and which is influenced to a relatively small degree by supply voltage variations, and one in which the power required to operate the same is low even in a stand-by condition.

Another specific object of the present invention is to provide a control system of this character which is characterized by its simplicity considering the functions and results achieved.

Another specific object of the present invention is to provide a control circuit of this character in which an open circuit in, for example, the leads extending to the photoelectric cell, does not result in full energization of the load, i. e., an open circuit causes an output equivalent to no signal.

Another specific object of the present invention is to provide a control system of this character which is positively reliable and one in which the components thereof are inherently stable.

Figure 1:
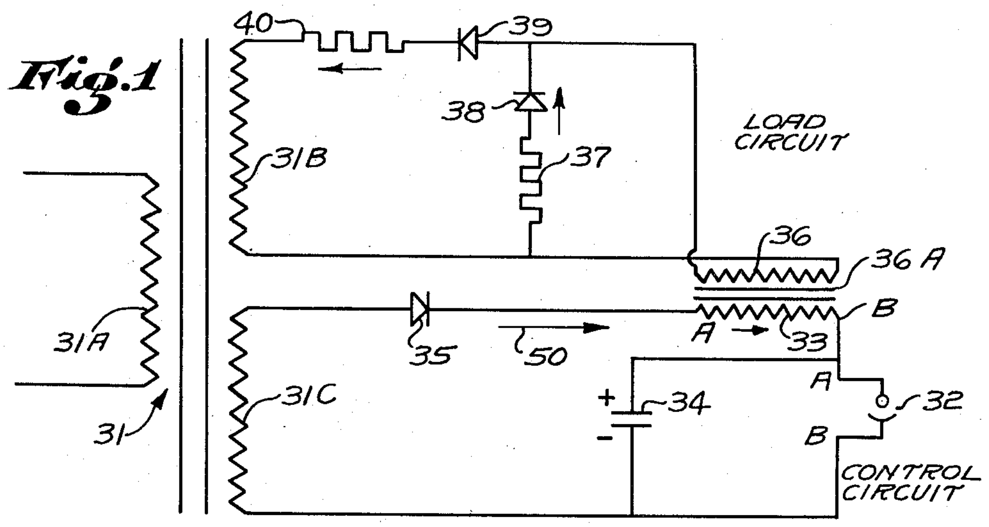
Figure 2:
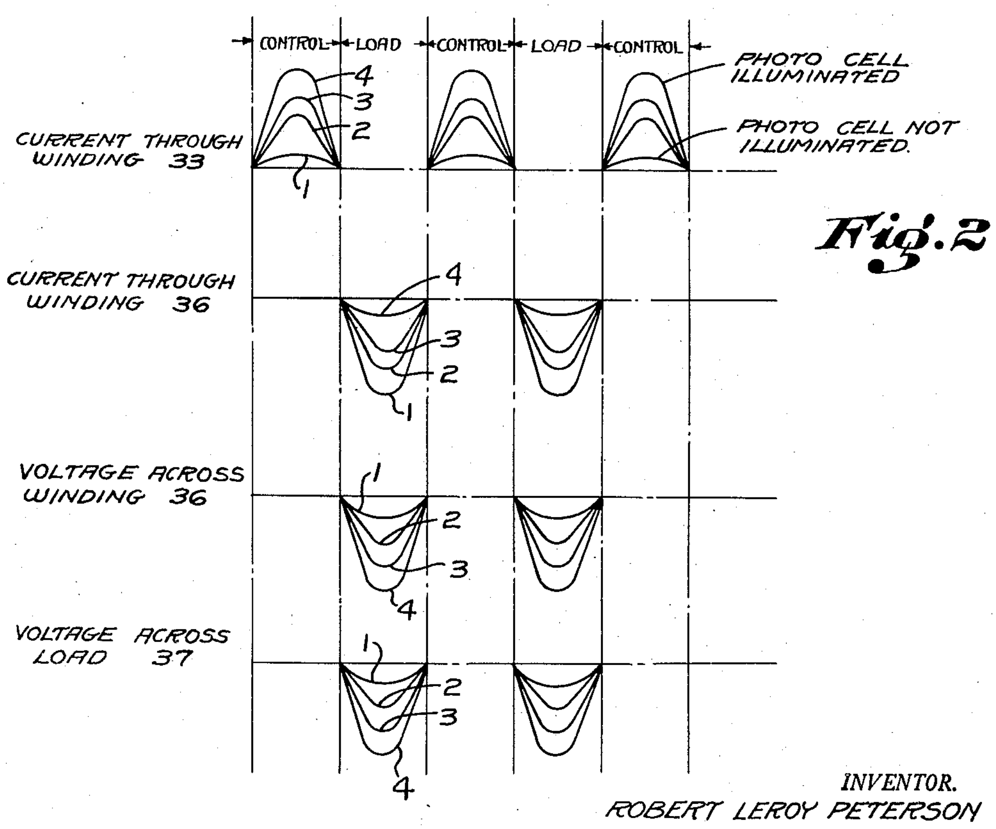

The features of the present invention which are believed to be novel are set forth with particularity in the appended claims. This invention itself, both as to its organization and manner of operation, together with further objects and advantages thereof, may be best understood with reference to the following description taken in connection with the accompanying drawings in which:

Figure 1 is a schematic circuit diagram of apparatus embodying the present invention for achieving the functions and results of the present invention; and Figure 2 shows wave forms of various voltages and currents existing, under certain conditions, during the operation of the circuit shown in Figure 1 to facilitate an understanding of the same.

Referring to Figure 1, the system shown therein functions to operate or fully energize the load 37 when the control element 32 is energized. While the load 37 is shown as a resistance, it is of course well understood that this is symbolic and the actual load may comprise a solenoid, a relay, a clutch, a heating resistance, and the like; and, while the control element 32 is shown as a photoelectric cell, it is of course well understood that the control element 32 may take other forms, i. e., may be a photoemissive or photoconductive cell, a flame conduction device, a thermocouple and the like, provided that it is arranged to control the rate at which the condenser 34 is discharged.

The system shown in Figure 1 may be deemed to include a control circuit and a load circuit. The control circuit may be considered to include the following elements: the secondary winding 31C of the transformer 31, the rectifier 35, saturable reactor winding 33, photoelectric cell 32, and condenser 34 which is connected in shunt with the photoelectric cell 32. The load circuit is considered to include the following elements, namely, the secondary winding 31B of the transformer 31, the current limiting resistance 40, the rectifier 39, saturable reactor winding 36 and the arm comprising load 37 and rectifier 38, such arm being connected in shunt with the winding 36.

It is observed that the half-wave rectifier 35 is serially connected between the transformer winding 31C and the reactor winding 33 such that only a unidirectional current may flow through winding 33 in the direction indicated by the arrow 50 and from the terminal A to terminal B of winding 33, whereby the condenser 34 may be charged with the polarity as indicated in Figure 1, with the positive terminal of the condenser 34 being connected to the terminal B. The anode of the photo tube 32 is connected to the positive terminal of condenser 34, while the negative terminal of condenser 34 is connected to the cathode of photo tube 32 and to one terminal of the transformer winding 31C. The photo tube 32 provides a discharge path through which the condenser 34 may discharge. The rate at which the condenser 34 discharges is, of course, determined by the resistance of the photoelectric cell 32 and its resistance, as is well known, may be decreased upon increased illumination of the same. In general, when the photoelectric cell 32 is fully illuminated, the load circuit 37 is fully energized, as evident from the following description.

When the resistance of the photoelectric cell 32 is very high, for example when it is not illuminated or inoperative for other reasons, there is no discharge path for the condenser 34 and, consequently, the voltage developed on the condenser 34 is substantially equal to the peak alternating voltage appearing across the winding 31C and appreciably no current flows through the reactor winding 33. This condition is represented in Figure 2 by the current variation 1 which, of course, as shown therein, appears every other half cycle. In Figure 2, the uppermost current variation represents the current through the reactor winding 33, and the different variations numbered 1, 2, 3, and 4 indicate progressive changes in amplitude of such current as the resistance of the photo tube 32 is decreased in steps. Curve 4 represents the condition when the photo tube 32 is fully energized, while curves 2 and 3 represent intermediate conditions. The second variation shown in Figure 2 represents the current through winding 36, the third variation represents the voltage across the winding 36, and the fourth variation represents the voltage across the load 37. In each of these four representations shown in Figure 2, the curves designated by the numeral 1 all relate to the same condition, and likewise, all curves having reference numeral 2 relate to a corresponding same condition, etc.

It is observed that, as the resistance of the photo tube 32 decreases, the amplitude of the half-wave current pulses passing through the winding 33 increases. With respect to the load circuit, the rectifier 39 is poled in relationship to the rectifier 35 such that current pulses through winding 36 and load 37, as indicated in Figure 2, appear as alternate half cycles and when there is substantially no current through winding 33. The resistance 40, which is serially connected with the winding 31B, reactor winding 36, and rectifier 39, is relatively large, i. e., a current limiting resistance of such magnitude that (under the condition when photo tube 32 is not illuminated) a relatively high current, i. e., the maximum current, flows through winding 36 to magnetically saturate the core 36A with magnetic flux to thereby decrease the impedance of winding 36 and, hence, the voltage developed thereacross, as indicated by the curves 1 in Figure 2. Under this condition, when the voltage across winding 36 is at its minimum, the current flow through the load 37 which is connected in shunt with the winding 36, is likewise at a minimum. The purpose of the control circuit is to decrease the saturation of the magnetic core 36A of the reactor 33, 36, so that the desired voltage may be developed across the winding 36 and, hence, the load 37. It is observed that the polarities of the windings 33 and 36 are such that, when energized as described above, they produce fluxes acting in opposite directions in the core 36A. Thus, the winding 36, as indicated in Figure 2, may be considered to have a negative effect on the magnetic core 36A, while the current flowing through the winding 33 may be considered to have a positive effect on the magnetization of the core 36A.

While initially (in the absence of illumination of the photoelectric cell 32) the core 36A is saturated by the current flowing through winding 36 in the negative sense, the positive magnetization effect produced by the current flowing through winding 33, during the control cycle, conditions the magnetic core 36A so that, during the subsequent load cycle, the impedance of the winding 36 is increased so that the current through the same is decreased to achieve full energization of the load.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a control system of the character described, a saturable reactor having a first winding and a second winding, a transformer having a first secondary winding and a second secondary winding, a first rectifier, a condenser, said first secondary winding, said rectifier, said first reactor winding and said condenser being serially connected, a control element having a variable resistance connected in shunt with said condenser and forming a discharge path for the charge on said condenser, a load, a current limiting resistance, a second rectifier, said second secondary winding, said current limiting resistance, said second rectifier and said load being serially connected, said second reactor winding being connected in shunt with said load, said first and second rectifiers being so poled that said first and second reactor windings conduct current only during opposite alternate halves of the alternating voltage developed in the secondary windings, and said first and second reactor windings having such polarities that the current flow in each produces opposite magnetic effects on the core of the saturable reactor.

2. In a system of the character described, a saturable reactor having a first winding and a second winding, a load, first means for energizing said first winding with half-wave pulses, second means connected to and energizing said second winding with half-wave pulses which appear alternately with the first-mentioned half-wave pulses, said first and second windings having such polarities that current flow through the same produces opposite effects on the magnetic core of the saturable reactor, a condenser connected in series with said first means and said first winding and charged by said first means, means controlling the discharge rate of said condenser, and a load circuit coupled to said second winding and being controlled by the last-mentioned means.

3. In a system of the character described, a saturable reactor having a first winding and a second winding, means for energizing said first winding with half-wave pulses occurring during a control cycle, a condenser connected in series with said first winding and said means for charging said condenser through said first winding, means controlling the discharge rate of said condenser, means energizing said second winding with half-wave pulses occurring alternately with the first-mentioned pulses during a load cycle, said first and second windings having such polarity that current flow through the same produces opposite effects on the magnetic core of the saturable reactor and a load coupled to said second winding and energized in accordance with the charged condition of said condenser.

4. In a system of the character described, a transformer having a first secondary winding and a second secondary winding, a first rectifier, a saturable reactor having a first winding and a second winding, a condenser, a serial circuit comprising: said first secondary winding, said rectifier, the first reactor winding and said condenser, whereby said condenser may be charged with half-wave pulses occurring during a control cycle, a photoelectric cell connected in shunt with said condenser to provide a discharge path for the charge on said condenser, a second rectifier, a current limiting resistance, a load, a second serial circuit comprising: said second secondary winding, said current limiting resistance, said second rectifier and said second reactor winding, to provide half-wave pulses appearing alternately with the first-mentioned half-wave pulses during a load cycle, said first- and second-mentioned half-wave pulses producing opposite magnetic effects on the magnetic core of said saturable reactor, and said load being connected in shunt with said second reactor winding and energized in accordance with the degree of illumination of said photoelectric cell.

5. In a system of the character described, a saturable reactor having a magnetic core and a first winding and a second winding on said core, a condenser, means deriving half-wave pulses occurring during a control cycle and applying the same to charge said condenser through said first winding, means deriving a second set of half-wave pulses occurring alternately with the first-mentioned half-wave pulses during a load cycle and applying the same to said second winding, said first and second windings having such polarity that current flow through the same has opposite effects on the magnetic core of the saturable reactor, means controlling the discharge rate of said condenser, and a load coupled to said second winding and controlled by said condenser discharge rate controlling means.

6. In a system of the character described, a source of current which produced a first series of time spaced half-wave pulses which occur alternately in timed relationship with a second series of interspersed like time spaced half-wave pulses and at different times than said second series of pulses, a saturable reactor having a first winding and a second winding both in inductive relationship to a common core, current limiting means, a first series circuit including said means and said first winding connected in series with respect to each other, means applying said first series of pulses to said first series circuit, a load connected in shunt with said first winding, current flow controlling means, a second series circuit including said second winding and said controlling means connected in series with respect to each other, said first and second windings being so poled with respect to each other that the current pulses applied respectively to said first and second windings produce opposite magnetic effects on said core, said controlling means being adjustable and in one adjusted condition thereof being effective to cause said load to be fully energized and in a second adjusted condition thereof being effective to decrease the impedance of said first winding sufficiently to thereby produce a relatively large voltage drop across said current limiting means and thereby prevent full energization of said load.

References Cited in the file of this patent

UNITED STATES PATENTS

| | | |
|---|---|---|
| 1,921,787 | Suits | Aug. 8, 1933 |
| 2,036,233 | Pakala | Apr. 7, 1936 |
| 2,259,647 | Logan | Oct. 21, 1941 |
| 2,518,953 | Sorensen et al. | Aug. 15, 1950 |
| 2,783,315 | Ramey | Feb. 26, 1957 |

FOREIGN PATENTS

| | | |
|---|---|---|
| 685,593 | Germany | Dec. 20, 1939 |